United States Patent
Bucher

(10) Patent No.: US 7,392,542 B2
(45) Date of Patent: Jun. 24, 2008

(54) RESTORATION OF DATA CORRUPTED BY VIRUSES USING PRE-INFECTED COPY OF DATA

(75) Inventor: Tim Bucher, Los Altos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 648 days.

(21) Appl. No.: 10/928,567

(22) Filed: Aug. 26, 2004

(65) Prior Publication Data
US 2005/0055559 A1    Mar. 10, 2005

Related U.S. Application Data

(60) Provisional application No. 60/499,254, filed on Aug. 29, 2003.

(51) Int. Cl.
*G06F 11/30* (2006.01)
(52) U.S. Cl. .............................. 726/22; 726/23; 726/24
(58) Field of Classification Search ............. 726/22–24; 713/188
See application file for complete search history.

(56) References Cited

U.S. PATENT DOCUMENTS

| | | | |
|---|---|---|---|
| 5,917,998 A * | 6/1999 | Cabrera et al. ................. | 714/6 |
| 6,795,835 B2 | 9/2004 | Ricart et al. | |
| 6,795,966 B1 | 9/2004 | Lim et al. | |
| 2002/0038296 A1 | 3/2002 | Margolus et al. | |
| 2002/0095317 A1 | 7/2002 | McCabe | |
| 2004/0030913 A1* | 2/2004 | Liang et al. ................. | 713/200 |

* cited by examiner

*Primary Examiner*—Hosuk Song
(74) *Attorney, Agent, or Firm*—David K. Lucente

(57) ABSTRACT

Post-infection virus protection through data restoration using mirrored data that has been obtained prior to the virus infection. A network appliance in a network mirrors the data of a number of computers in an ongoing manner. An anti-virus module of the network appliance scans data received from a computer to determine whether the computer is infected by a virus. If no virus is identified, the network appliance uses the received data to update a mirrored copy of the computer's data. If, however, the network appliance identifies a virus, the mirrored copy is not updated. Instead, the previous mirrored copy, which represents a pre-infection state of the data, is used to restore the infected computer to its pre-infection state. In this manner, a single copy of an anti-virus utility executed at the network appliance can protect an arbitrary number of computers, which do not require their own anti-virus software.

21 Claims, 4 Drawing Sheets

RESTORATION OF DATA CORRUPTED BY VIRUSES USING PRE-INFECTED COPY OF DATA

CROSS-REFERENCE TO RELATED APPLICATIONS

This application claims the benefit of U.S. Provisional Application Ser. No. 60/499,254, filed Aug. 29, 2003, which is incorporated herein by reference.

BACKGROUND OF THE INVENTION

1. The Field of the Invention

This invention relates generally to the field of computer networking and data storage. In particular, embodiments of the present invention relate to a method of post-infection virus protection through data recovery using a mirrored copy of the data obtained prior to infection.

2. The Relevant Technology

Computer and data communications networks continue to proliferate due to declining costs, increasing performance of computer and networking equipment, and increasing demand for communication bandwidth. Communications networks, including wide area networks ("WANs") and local area networks ("LANs"), allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

One of the major dangers of computer networks pertains to the increased exposure to viruses and other forms of corruption. Most computer networks are connected to the internet via some form of internet portal which provides internet access to all of the devices within the network. Unfortunately, there are numerous destructive programs lurking on the internet that can invade a network through a simple email or downloaded file. Additionally, a computer in a local area network can become unintentionally infected with a computer virus through other mechanisms, such as when a file is loaded directly to the computer using, for example, a CD-ROM, a floppy disk, or other such removable media. In these instances, the local area network can cause the virus to proliferate to other devices in the network.

To counteract these potential security breaches, many computer users employ anti-virus software that screens files and other data downloaded onto a particular device. These screens look for particular software patterns that are known to match a virus or some other form of destructive program. The screening programs are therefore only effective against known destructive programs and provide little or no protection against new destructive programs.

Two of the major problems associated with existing anti-virus software are its cost and the complexity of maintaining and using the software. Because new viruses appear continually, frequent updates of the virus software are typically required. The cost of using and maintaining anti-virus software can include the initial purchase and an ongoing subscription, which enables the software to be updated to recognize new viruses. The complexity and cost of anti-virus software are multiplied as the number of computers in a network grows. As a result, many computer users, particularly individual users, home offices and small offices, are unable or unwilling to employ anti-virus software, which leads to frequent data loss and other related computer problems.

BRIEF SUMMARY OF EMBODIMENTS OF THE INVENTION

These and other problems in the prior art are addressed by embodiments of the present invention, which relates to a method of post-infection virus protection by replacing infected data with a previously stored, uninfected copy of the data. A copy of all data is sent to a network appliance which analyzes whether it contains a virus. If no virus is detected in the data, the data is stored on the network appliance for restoration purposes. If however, a virus is detected in the data, the data is not stored and some form of restoration process is performed on the originating storage device. The method of virus protection can also be used in conjunction with existing pre-infection virus protection techniques to provide a supplemental level of protection.

The invention can be implemented in a local area network that includes one or more computers that may be subject to being infected by viruses. In addition, the network includes a network appliance that communicates with the computers and maintains mirrored copies of the data stored by the computers. After the computers store data that is received from, for example, the internet, a copy of the newly stored data is transmitted to the network appliance to be stored thereon if the data is not infected with a virus. In this manner, the network appliance maintains a backup copy of the data that is stored on the computers in the local area network that can be used to restore the data on any one of the computers to a previous pre-infection state.

The virus protection methods of the invention utilize a signature analysis module that operates on the network appliance. In operation, data is received by a computer in the network and stored thereon. A copy of the data is then transmitted to the network appliance where it is analyzed by the signature analysis module for potential viral infection. If the signature analysis module does not detect a virus, the data is stored on the network appliance for restoration purposes. If however, the signature analysis module detects a virus on the copy of data, the computer within the network in which the data originated from may be infected. Because the network appliance stores multiple previous versions of the data, the infected data on the computer within the network can be replaced with a pre-infection version. This process includes deleting the corrupted data at the computer, reinstalling applications or other software, and restoring data at the computer. Because the network appliance stores a mirrored copy of the data of the computer, the entire restoration process can be performed based on data stored at the network appliance.

One benefit of the invention is that a single network appliance can be used to protect multiple computers within a network. This approach to virus protection provides significant advantages compared to conventional anti-virus systems. Because only a single network appliance is needed, the cost of virus protection in a network can be much less than the cost of installing and maintaining anti-virus software at each computer in a network. In addition, the complexity of the process of installing and maintaining the anti-virus software is also significantly decreased, since the software does not exist independently on each of the computers in the network. The decreased cost and complexity of this system enables individual computer users and small and home offices to more easily take advantage of anti-virus systems. The present invention method of virus protection can also be used in conjunction with existing anti-virus systems to produce an even more secure network or computer.

The foregoing, together with other features and advantages of the present invention, will become more apparent when referred to the following specification, claims and accompanying drawings.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

I. Virus Recovery Using Mirrored Data Obtained Prior to Corruption

Figure 1:
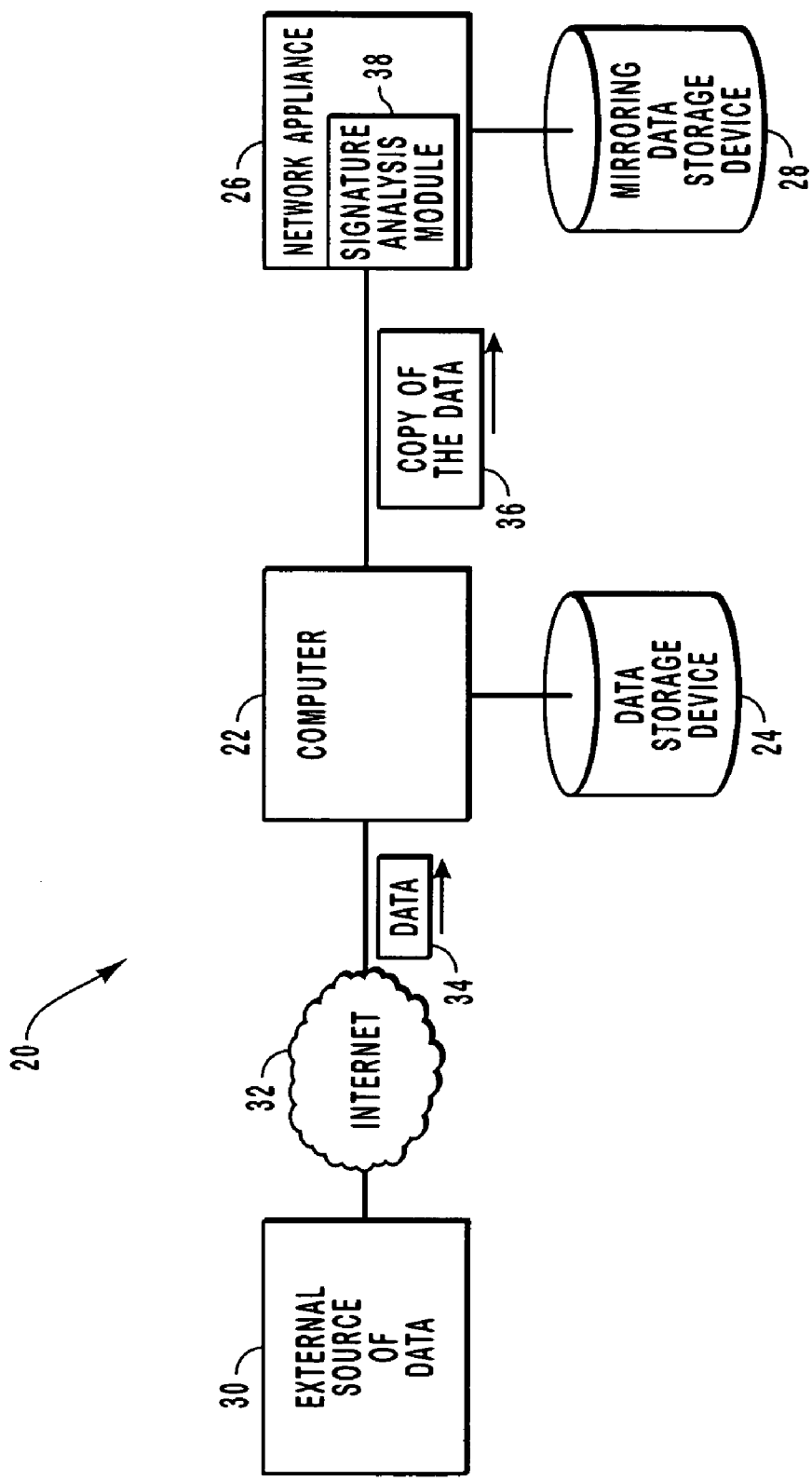
FIG. 1 is a block diagram illustrating general principles of the virus identification and data restoration methods of the invention.

Prior to presenting examples of the various network configurations in which the invention can be practiced, as shown in the examples of FIGS. 2-5, fundamental concepts regarding the restoration of corrupted data according to the invention are presented in reference to FIG. 1. According to FIG. 1, a network 20 in which the methods of the invention can be practiced includes a computer 22 with a data storage device 24 and a network appliance 26 with an associated mirroring data storage device 28. Computer 22 has access to an external source of data 30, which is accessed, for example, via the internet 32.

In operation, computer 22 receives data 34 from an external source 30. This data 34 can be substantially any data that a computer could obtain from the internet 32 or from other sources. The data 34 may then be stored in storage device 24. Network appliance 26 receives a copy of the data 36 that has been stored in storage device 24 so that a mirrored copy of the data 36 can be maintained at the mirroring storage device 28. Before storing the copy of the data 36, the copy of the data 36 is analyzed by a signature analysis module 38 within the network appliance 26. The signature analysis module 38 analyzes the copy of the data 36 to determine if a virus is present. Computer-readable data, including computer programs, have particular signatures or patterns which can be detected or calculated in specified ways. The signature analysis module 38 includes a list of known viruses and their signatures. This list of virus signatures is then compared to all incoming data before it is stored on the mirroring data storage device 28. If a virus is detected in the copy of the data 36 transferred from the computer 22, the network appliance 26 will not store the copy of the data 26. The presence of a virus in the copy of the data 36 indicates that computer 22 is most likely infected with the virus. If however, no viruses are detected in the copy of the data 36, the network appliance stores the copy of the data 36 on the mirroring data storage device 28. By storing a copy of the data 36 on the mirroring data storage device 28, the network appliance 26 is able to restore the data on the storage device 24 to a pre-infection state.

Because a mirrored copy of the data 36 within storage device 24 is maintained in an ongoing manner at the mirroring data storage device 28, the mirrored copy can be updated by receiving from computer 22 information that represents incremental changes to storage device 24 as new data is stored thereon. As network appliance 26 receives updates to the copy of the data 36 representing the changes made to the data of storage device 24, the network appliance again uses the signature analysis module 38 to scan the copy of the data 36 updates for the presence of a virus. As described above, if the signature analysis module 38 detects a virus, the copy of the data 36 update will not be stored on the mirroring data storage device 28. If however, no viruses are detected on the copy of the data 36 update, the copy of the data 36 update will be stored on the mirroring data storage device 28. In this way, network appliance 26 preserves in the mirroring storage device 28 a pre-infection copy of the data 36 within storage device 24. This pre-infection mirrored copy of the data 36 can be used to restore storage device 24 and computer 22 to its pre-infected state. The mirroring data storage device 28 does not replace existing data every time an update is stored. Instead, multiple sequential versions of the copy of the data 36 are stored on the mirroring storage device 28 to further ensure that the data 34 stored on the mirroring data storage device 28 is not infected or corrupted in any way.

Whenever a virus is detected in the copy of the data 36 by the signature analysis module 38 within the network appliance 26, the network appliance 26 automatically executes a data restoration process that includes replacing the corrupted data on the data storage device 24 with an older uncorrupted version of the data that is stored within the mirroring data storage device 28. Alternatively, a manual restoration sequence can be initiated to replace the data stored on the data storage device 24 with one of the older versions stored on the mirroring data storage device 28. The manual sequence may be used when a virus has infected the computer 22 and prevented it from operating properly or when the network appliance 26 fails to detect a virus but the virus is detected by some other method.

As is discussed in greater detail below, a single network appliance 26 can be used with one or many computers 22 to perform mirroring operations and to determine whether any of the computers have been infected by viruses. Thus, when a single network appliance 26 is used with multiple computers in, for example, a local area network, all of the computers can be protected against data loss due to viruses using a single anti-virus utility executed a the network appliance.

The following description of FIGS. 2-5 includes details of various network environments in which the invention can be used. Although the following paragraphs describe various suitable network configurations, the invention can also be implemented in other networks in which a network appliance determines that an associated computer has been infected by a virus and restores the computer to its pre-infection state using a pre-infection mirrored copy of data.

II. Wireless Network Architecture

Figure 2:
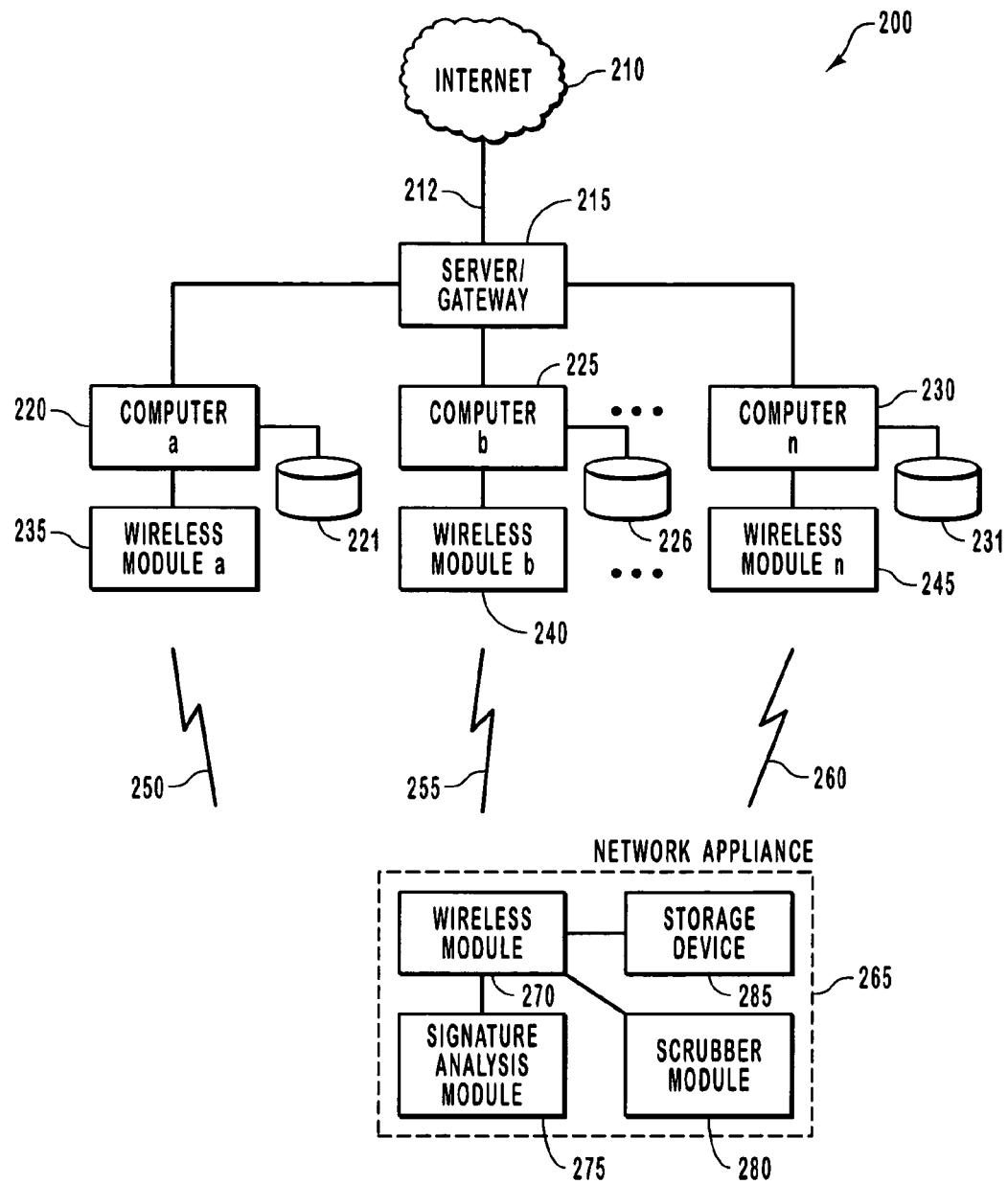
FIG. 2 is a block diagram illustrating a distributed networking environment configured to implement one embodiment of the present invention to enable the recovery of a corrupted set of data.

Reference is first made to FIG. 2, which illustrates a functional block diagram of a distributed networking environment configured to implement one wireless embodiment of the present invention, designated generally at 200. The distributed networking environment 200 includes a server/gateway 215 connected to the internet 210 via an internet portal 212. The internet portal 212 is a high speed data connection mechanism including but not limited to a T1, T2, T3, DSL, cable modem, or broadband modem. The internet portal 212 allows data to be transferred between the server/gateway 215 and the internet 210 at a relatively high speed. The server/gateway 215 is also connected to an arbitrary number of computers, which are illustrated in FIG. 2 as computers a (220), b (225), and n (230).

The server/gateway 215 acts as a router for data transferred between the computers 220, 225, 230 and the internet 210. The server/gateway also controls the communication of data between the computers 220, 225, 230. The computers 220, 225, 230 and the server/gateway 215 are connected in accordance with a local networking scheme, such as Ethernet, Token Ring, USB networking, etc. The computers 220, 225, 230 and the server/gateway 215 contain some form of network interfacing device to allow them to communicate with one another. In the absence of the invention, this standard networking architecture is relatively vulnerable to a destructive program, such as a virus. Since data can be easily be transmitted from the internet 210 to any of the computers 220, 225, 230, a virus could easily be downloaded and executed, which could then corrupt data in the storage devices 221, 226 and 231. The virus could then propagate to the other computers and the server/gateway 215, potentially causing an entire network failure or significant data loss in the absence of the anti-virus methods of the invention.

Each of the computers 220, 225, 230 is connected to a corresponding wireless module a (235), b (240) and n (245), which enable the computers to transmit and receive data using wireless signals 250, 255, 260. The wireless module encodes and decodes data between electrical signals and wireless signals. The wireless signals conform to a wireless standard, such as IEEE 802.11, Bluetooth, UWB, IR, etc. The wireless modules 235, 240, 245 enable the computers 220, 225, 230 to communicate with a network appliance 265, which represents an example of the network appliance illustrated in FIG. 1. The communication between the computers 220, 225, 230 and the appliance 265 is separate from the networking communications between the computers 220, 225, 230, the internet 210, and the server/gateway 215.

The network appliance 265 further includes a wireless module 270, a signature analysis module 275, a scrubber module 280, and a storage device 285. The wireless module 270 within the network appliance 265 is configured to be compatible with the wireless modules 235, 240, 245 connected to each of the computers 220, 225, 230. Therefore, a wireless data pathway is established between the appliance 265 and the computers 220, 225, 230, such that data can be transmitted and received back and forth. In this manner, the computers 220, 225 and 230 communicate with network appliance 265 to permit the network appliance to perform the mirroring operations described above in reference to FIG. 1.

The signature analysis module 275 is a firmware or software module that is configured to perform signature analysis on a set of data to determine whether the signature of the data is consistent with that of a known virus. Thus, as data is transmitted to network appliance 265 as part of the mirroring operations, the signature analysis module 275 scans the data to determine whether the corresponding computer 220, 225, or 230 has experienced infection by a virus. Upon learning of the disclosure made herein, those of skill in the art will understand how to apply signature analysis to the data in order to determine whether the corresponding computer has been infected by a virus. If it is determined that no virus has been received by the corresponding computer 220, 225 or 230, the data that is transmitted to the network appliance is applied to storage device 285 so as to update the mirrored copy. If, however, it is determined that the data contains an indication of viral infection at the corresponding computer 220, 225, or 230, the mirrored copy of the data in storage device 285 is not updated, thereby enabling the pre-infection mirrored copy of data to be preserved, which can then be used to restore the computer to its pre-infection state.

In the event of the detection of a virus, the scrubber module 280 is configured to delete the data that has been corrupted within the storage device of the corresponding computer 220, 225, or 230, which can be as much as all of the data in the storage device, including software and content (e.g., data files, documents, etc.). Deleting the data in this manner has the dual effect of eliminating the corrupted data and eliminating any copy of the virus in the storage device, thereby preventing further propagation of the virus in the network. In addition, scrubber module 280 controls the restoration of the data to the storage device using the pre-infection mirrored copy of the data. As described above, the virus protection techniques of the invention can be implemented using only a single copy of anti-virus software (i.e., signature analysis module 275) executed at the network appliance. Alternatively, each computer 220, 225, and 230 can have its own anti-virus software in addition to the anti-virus software executed at the network appliance 265. This approach provides dual protection against viruses, including a first line of defense to prevent initial infection, and the network appliance, which permits the pre-infection data to be restored in the event of infection by a virus.

III. Integrated Network Architecture

Figure 3:
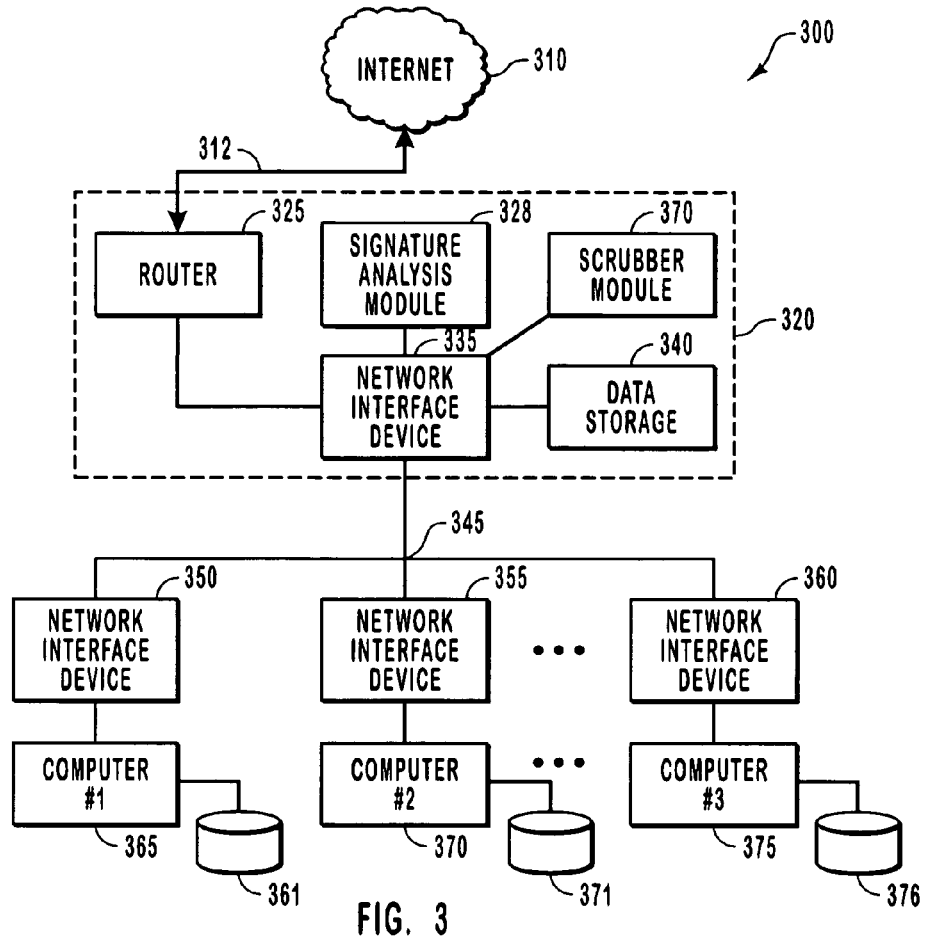
FIG. 3 is a block diagram illustrating a distributed networking environment configured to implement an alternative embodiment of the present invention to enable the recovery of a corrupted set of data.

Reference is next made to FIG. 3 which illustrates a functional block diagram of a distributed networking environment configured to implement an alternative integrated embodiment of the present invention, designated generally at 300. This embodiment differs in that the appliance is incorporated into the wired computer network rather than connecting to the computer devices over a wireless interface. The distributed networking environment 300 includes an appliance 320 connected to the internet 310 via an internet portal 312. The internet portal 312 is a high speed data connection mechanism. The internet portal 312 allows data to be transferred between the appliance 320 and the internet 310 at a relatively high speed. The appliance 320 is connected to an arbitrary number of computers a (365), b (370) and n (375) via a wired network connector 345 and a series of network interface devices 335, 350, 355, 360. In this embodiment, the network appliance 320 acts as a router for data transferred between the computers 365, 370, 375 and for data transferred between the computers and the internet 310. The computers 365, 370, 375 and the appliance 320 are connected in accordance with a local networking scheme including but not limited to Ethernet, Token Ring, USB networking, etc. The network interface devices 335, 350, 355, 360 that are connected to the computers 365, 370, 375 and the appliance 320 are a standard device that encodes data signals into a particular format such as an Ethernet NIC card, a token ring card, USB port, etc.

It is noted that FIG. 2 illustrates a wireless communication interface between the computers and the network appliance, whereas FIG. 3 illustrates a wired communication interface between the computers and the network appliance. However, the invention can be practiced in networks that have any type of communication interface or combinations thereof. Indeed, some computers in any given network can communicate using wired communication interfaces, while others in the same network can communicate using wireless interfaces. The network architectures of FIGS. 2-5 are presented to illustrate that the invention can be practiced in any of a wide variety of networks.

In the absence of the invention, the distributed networking architecture of FIG. 3 is also relatively vulnerable to a destructive program, such as a virus. Since data can be easily be transmitted from the internet 310 to any of the computers 365, 370 and 375, a virus could easily be downloaded and executed, which could then corrupt data in the storage devices 366, 371 and 376. The virus could then propagate to the other computers, potentially causing an entire network failure or significant data loss in the absence of the anti-virus methods of the invention.

The network appliance 320 of FIG. 3 is positioned between the computers 365, 370, 375 and the internet 310 rather than as an auxiliary device as illustrated in FIG. 2. This eliminates the need for a separate router or gateway module, thus enabling a more streamlined and user-friendly network architecture. The appliance 320 further includes a router 325, a signature analysis module 328, a scrubber module 330, a network interface device 335, and a storage device 340. The router 325 transmits information between the internet 310 and the computers 365, 370, 375 through the network interface device 335. This routing function of the network appliance 320 is separate from the mirroring and virus protection functions of the appliance that are performed by the signature analysis module 328, scrubber module 330 and the storage device 340.

The signature analysis module 328, the scrubber module 330, and the storage device 340 operate in substantially the same manner as that described above in reference to the corresponding components of the network appliance 265 of FIG. 2. The signature analysis module 328 of FIG. 3 analyzes a set of data that has been transmitted to network appliance 320 for mirroring to determine whether the set of data is consistent with a viral infection of the corresponding computer 365, 370 or 375. If there are no indications of the presence of a virus at the corresponding computer, the set of data is applied to the storage device 340 so as to update the mirrored copy of the data. If, however, it is determined that a virus has infected the data, the data of the corresponding computer is restored as described above in reference to FIG. 2.

IV. Local Architecture

Figure 4:
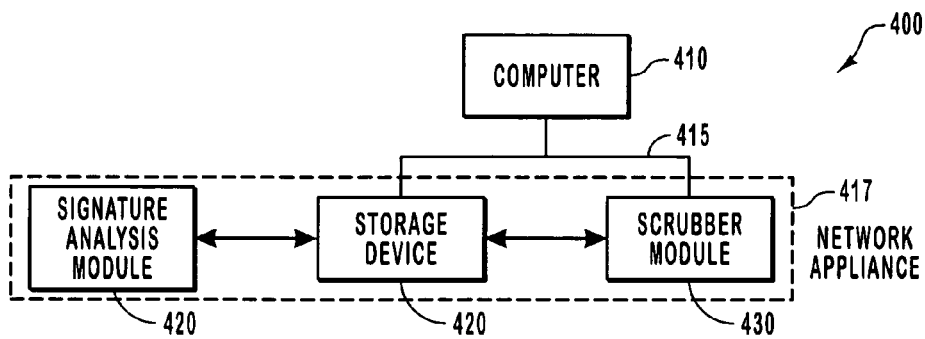
FIG. 4 is a block diagram illustrating an isolated computing environment configured to implement one embodiment of the present invention to enable the recovery of a corrupted set of data.

Reference is next made to FIG. 4 which illustrates a functional block diagram of an isolated computing environment configured to implement another embodiment of the present invention, designated generally at 400. FIG. 4 illustrates an exemplary embodiment of the present invention that can be applied to protect a single local computer from data corruption. A single isolated computer is potentially exposed to viruses or destructive programs every time a new piece of data is uploaded into the computer via some form of portable data storage device, such as a floppy disk, a compact disk, an external hard disk, etc.

The isolated computing environment 400 includes a computer 410 and a network appliance 417 connected via a data link 415. The computer 410 in this example is not attached to any other computers or the internet, and is simply used independently. The appliance 417 further includes a storage device 420, a signature analysis module 425 and a scrubber module 430. The storage device 420, the signature analysis module 425 and the scrubber module 430 operate in substantially the same manner as that described above in reference to FIG. 2. The signature analysis module 425 of FIG. 4 analyzes a set of data that has been transmitted to network appliance 417 for mirroring to determine whether the set of data is consistent with a viral infection of the computer 410. If there are no indications of the presence of a virus at the computer 410, the set of data is applied to the storage device 420 so as to update the mirrored copy of the data. If, however, it is determined that a virus has infected the data, the data of the corresponding computer is restored as described above in reference to FIG. 2.

FIG. 4 illustrates the fact that the source of viruses is not limited to the internet, nor to other remote, external sources of data. As shown in FIG. 4, the restoration procedures of the invention can be applied in response to data corruption caused by viruses encountered in any of a variety of networks. Indeed, the networks of FIGS. 2, 3 and 5 are also susceptible to viruses obtained from local sources, as has been described above in reference to FIG. 4, and these networks are also capable of restoring data lost in this manner.

V. Dual Protection Network Architecture

Figure 5:
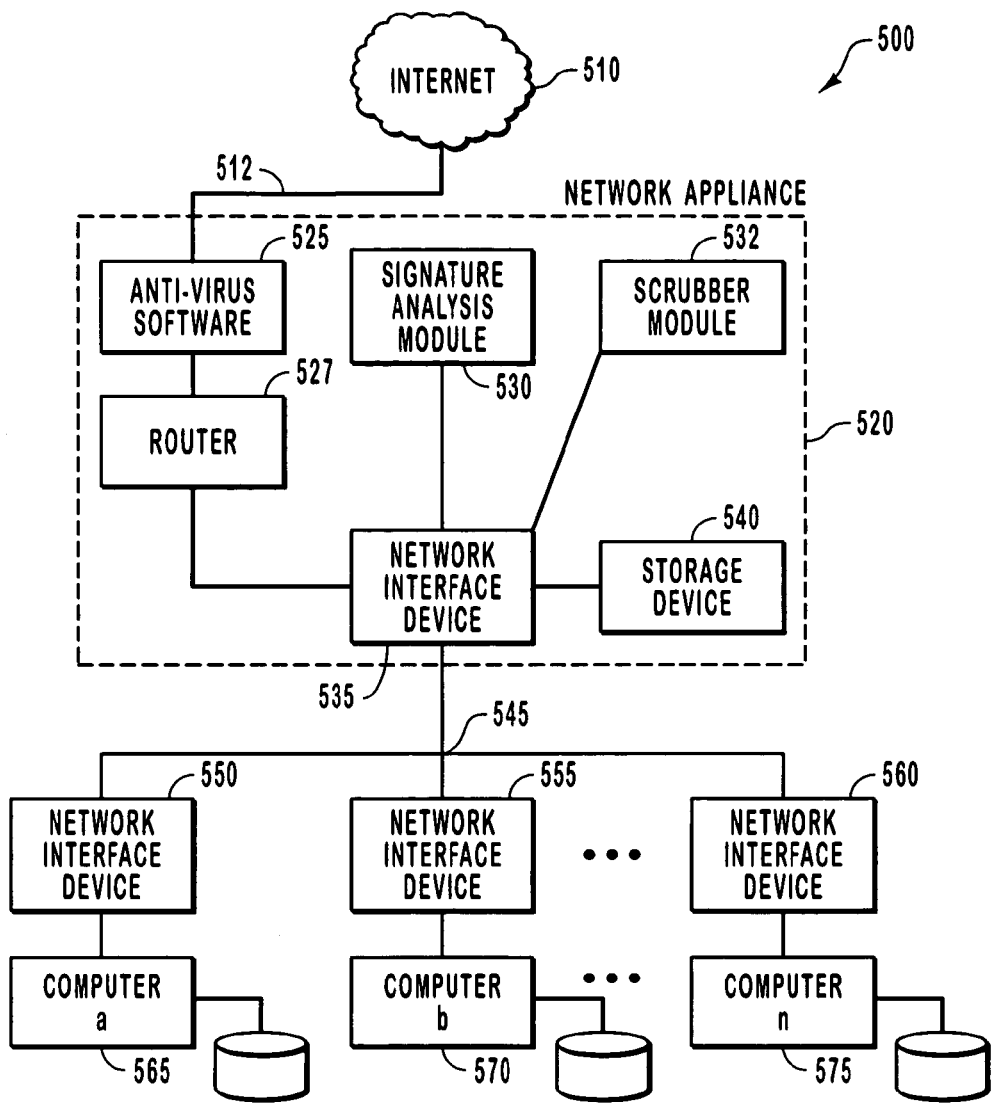
FIG. 5 is a block diagram illustrating a distributed networking environment configured to implement yet another alternative embodiment of the present invention to enable the recovery of a corrupted set of data.

Reference is next made to FIG. 5, which illustrates a functional block diagram of a distributed networking environment configured to implement an alternative dual protection embodiment of the present invention, designated generally at 500. This embodiment is similar to the embodiment illustrated in FIG. 3, except that the network appliance of FIG. 5 includes anti-virus software the scans data obtained from the internet prior to being routed to the appropriate computer. This anti-virus software that scans data prior to being routed to the appropriate computer is employed in addition to the anti-virus software that is used during the mirroring process.

As shown in FIG. 5, network appliance 520 includes anti-virus software 525 that is used to scan incoming data that is received from internet 510. This anti-virus software 525 can be conventional anti-virus software that identifies the presence of viruses and, upon identifying a virus, prevents its execution. As shown in FIG. 5, anti-virus software 525 is applied to the incoming data prior to the data being routed to the appropriate computer 565, 570, or 575.

Scanning all incoming data in this manner can be computationally expensive, particularly when the network appliance 520 routes internet data to a relatively large number of computers or has a particularly high bandwidth. Using anti-virus software 525 in this manner provides an additional degree of protection against viruses in addition to the post-infection restoration methods described herein. In other embodiments, such as the networks described above in reference to FIGS. 2 and 3, the post-infection restoration techniques provide suitable protection against data loss without requiring the significant processing capabilities associated with the implementation of anti-virus software 525 in the manner illustrated in FIG. 5. In general, there is a tradeoff between a more expensive network appliance (e.g., appliance 520 of FIG. 5) that has the pre-infection anti-virus software and the less expensive network appliance (e.g., appliance 265 of FIG. 2 and 320 of FIG. 3), which implements only the post-infection restoration methods.

The distributed networking environment 500 includes an appliance 520 connected to the internet 510 via an internet portal 512, which allows data to be transferred between the appliance 520 and the internet 510 at a relatively high speed. The appliance 520 is connected to an arbitrary number of computers a (565), b (570) and n (575) via a wired network connector 545 and a series of network interface devices 535, 550, 555, 560. Alternatively, these components can communicate using wireless communication as described in reference to FIG. 2. In this embodiment, the appliance 520 acts as a router for data transferred between the computers 565, 570, 575 and between the computers and the internet 510.

As described above, the anti-virus software 525 provides a first line of protection against viruses, and can generally prevent viruses from reaching computers 565, 570 and 575. This pre-infection virus protection is typically successful in keeping the majority of viruses out of the network. However, in the event that the pre-infection anti-virus software 525 fails to prevent infection of a computer, the post-infection restoration techniques described herein can be applied to the infected computer. In particular, the signature analysis module 530, scrubber module 532 and storage device 540 operate in substantially the same manner as that described above in reference to FIG. 2 to provide post-infection virus protection. Therefore, the combination of the pre-infection and post-infection forms of virus protection in this embodiment create a higher level of virus protection than either of the individual forms.

VI. Exemplary Computing Environment

The following discussion is intended to provide an additional general description of an example of a suitable computing environment in which embodiments of the present invention may be implemented. Although not required, embodiments of the invention may be described in the general context of computer-executable instructions, such as program modules, being executed by computers operating within network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that embodiments of the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method comprising:
   determining whether a set of data received from a computer exhibits an indication of data corruption at the computer; and if the set of data exhibits an indication of data corruption, performing acts of:
   causing data at the computer to be deleted so as to eliminate the source of the data corruption; and
   transmitting a copy of the mirrored data from a network appliance to the computer to restore the data that has been corrupted at the computer, wherein the mirrored data represents data that was stored at the computer prior to the data corruption.

2. The method of claim 1, wherein the act of determining whether the set of data exhibits an indication of data corruption comprises the act of performing signature analysis on the set of data.

3. The method of claim 2, wherein the act of performing signature analysis on the set of data is conducted so as to determine whether the set of data is consistent with the computer having received a virus.

4. The method of claim 1, wherein the act of causing data at the computer to be deleted comprises the acts of:
   deleting all data on a storage device associated with the computer; and
   reformatting the storage device.

5. The method of claim 1, wherein the act of transmitting a copy of the mirrored data is performed by transmitting the copy of the mirrored data using a wireless communications interface.

6. The method of claim 1, wherein the act of transmitting a copy of the mirrored data is performed by transmitting the copy of the mirrored data using a wired communications interface.

7. The method of claim 1, further comprising the act of receiving the set of data in response to the computer sending the set of data to the network appliance to enable the network appliance to perform a mirroring operation.

8. The method of claim 1, wherein:
   the network appliance maintains a mirrored copy of data from each of a plurality of computers; and
   the act of determining is performed in response to each of the plurality of computers sending sets of data to the network appliance to enable the network appliance to perform mirroring operations for each of the plurality of computers.

9. The method of claim 1, wherein the indication of data corruption comprise an indication that the computer has received a virus.

10. The method of claim 1, wherein the network appliance resides in a local network that also includes a plurality of computers, wherein none of said plurality of computers operates anti-virus software.

11. A method comprising:
    receiving a set of data from a computer;

determining whether the set of data exhibits an indication of the computer having received virus;

and if the set of data exhibits said indication, performing acts of:

causing data at the computer to be deleted so as to eliminate any copy of the virus at the computer; and transmitting a copy of the mirrored data from a network appliance to the computer to restore the data that has been corrupted at the computer, wherein the mirrored data represents data that was stored at the computer prior to the data corruption.

12. The method of claim 11, wherein the network appliance is incorporated in a network appliance that maintains a mirrored copy of data from each of a plurality of computers.

13. The method of claim 12, wherein the network appliance also operates as a router that enables the plurality of computers to communicate with the internet.

14. The method of claim 13, wherein the network appliance further includes anti-virus software that scans data received from the internet for viruses prior to the data received from the internet being routed to any of the plurality of computers.

15. The method of claim 13, wherein none of the plurality of computers operates anti-virus software.

16. The method of claim 11, wherein the act of determining whether the set of data exhibits an indication of the computer having received a virus comprises the act of performing signature analysis on the set of data.

17. A computer network, comprising:

one or more computers, each having a storage device in which data is stored; and a network appliance including:

a mirroring storage device that maintains a mirrored copy of the data stored in the storage device of each of the one or more computers;

a signature analyzer that performs signature analysis on sets of data received from the one or more computers to determine whether the sets of data exhibit an indication of corruption of the data stored in the storage devices of the corresponding computers; and a scrubbing module that, if it is determined that a particular set of data exhibits said indication, controls restoration of the data stored in the storage device of the corresponding computer.

18. The computer network of claim 17, wherein the signature analyzer operates to determine whether the sets of data exhibit an indication that the corresponding computers have received a virus.

19. The computer network of claim 17, wherein the network appliance is incorporated in a network appliance that also includes a router that enables the one or more computers to communicate with the internet.

20. The computer network of claim 19, wherein the network appliance further includes anti-virus software that scans data received from the internet for viruses prior to the data received from the internet being routed to any of the one or more of computers.

21. The computer network of claim 17, wherein none of the one or more computers executes anti-virus software.

* * * * *